United States Patent
Fleming

(10) Patent No.: US 7,156,552 B2
(45) Date of Patent: Jan. 2, 2007

(54) TEMPERATURE SENSOR SYSTEM FOR MOBILE PLATFORMS

(75) Inventor: Rex J. Fleming, Boulder, CO (US)

(73) Assignee: University Corporation for Atmospheric Research, Boulder, CO (US)

( * ) Notice: Subject to any disclaimer, the term of this patent is extended or adjusted under 35 U.S.C. 154(b) by 154 days.

(21) Appl. No.: 10/935,530

(22) Filed: Sep. 7, 2004

(65) Prior Publication Data
US 2006/0050767 A1    Mar. 9, 2006

(51) Int. Cl.
  *G01K 1/02*   (2006.01)
  *G01K 17/06*  (2006.01)
  *G01K 17/10*  (2006.01)
  *G01K 13/02*  (2006.01)

(52) U.S. Cl. .................. 374/141; 374/147; 374/29; 374/208; 374/138

(58) Field of Classification Search .......... 374/147, 374/208, 29, 138, 148; 702/130
See application file for complete search history.

(56) References Cited

U.S. PATENT DOCUMENTS

| | | | |
|---|---|---|---|
| 2,970,475 A | 2/1961 | Werner | |
| 3,016,745 A * | 1/1962 | Simon | 136/231 |
| 3,512,414 A * | 5/1970 | Rees | 374/148 |
| 4,152,938 A * | 5/1979 | Danninger | 374/138 |
| 4,385,658 A * | 5/1983 | Leonard | 165/11.1 |
| 4,403,872 A * | 9/1983 | DeLeo | 374/138 |
| 4,549,706 A * | 10/1985 | Stickney | 244/1 R |
| 4,644,806 A | 2/1987 | Flagg et al | |
| 5,161,890 A | 11/1992 | Fima et al | |
| 5,236,391 A * | 8/1993 | Schaefer | 44/253 |
| 5,302,026 A | 4/1994 | Phillips | |
| 5,544,526 A | 8/1996 | Baltins et al. | |
| 5,653,538 A | 8/1997 | Phillips | |
| 5,731,507 A | 3/1998 | Hagen et al. | |
| 5,764,539 A * | 6/1998 | Rani | 702/130 |
| 6,070,475 A | 6/2000 | Muehlhauser et al. | |
| 6,076,963 A * | 6/2000 | Menzies et al. | 374/138 |
| 6,091,335 A | 7/2000 | Breda et al | |
| 6,250,149 B1 | 6/2001 | Black | |
| 6,269,320 B1 | 7/2001 | Otto | |
| 6,370,450 B1 * | 4/2002 | Kromer et al. | 701/14 |
| 6,409,198 B1 | 6/2002 | Weimer et al. | |
| 6,550,344 B1 * | 4/2003 | Bachinski et al. | 73/861.05 |
| 6,609,825 B1 | 8/2003 | Ice et al. | |

(Continued)

FOREIGN PATENT DOCUMENTS

EP    0374822 A    6/1990

(Continued)

*Primary Examiner*—Gail Verbitsky
(74) *Attorney, Agent, or Firm*—The Ollila Law Group LLC

(57) ABSTRACT

A temperature sensor system includes a body and window arrangement. The body defines an air intake and is flush mounted to a mobile platform having a boundary layer. The window arrangement is integrated into the body and transfers a first signal and receives a second signal. The second signal represents energy from the first signal that is reflected by air particles beyond the boundary layer. The second signal is processed to determine a temperature beyond the boundary layer. The air intake receives air particles, transfers a first set of the air particles to a first air vent into the mobile platform, receives the first set of the air particles from a second air vent from the mobile platform, vents the first set of the air particles, and vents a second set of the air particles that bypass the first air vent.

38 Claims, 4 Drawing Sheets

U.S. PATENT DOCUMENTS

| | | | |
|---|---|---|---|
| 6,672,152 B1 | 1/2004 | Rouse et al. | |
| 6,809,648 B1 * | 10/2004 | Fleming | 340/601 |
| 6,817,240 B1 * | 11/2004 | Collot et al. | 73/170.02 |
| 6,827,485 B1 * | 12/2004 | Isebrand | 374/141 |
| 6,840,672 B1 * | 1/2005 | Ice et al. | 374/139 |
| 6,941,805 B1 * | 9/2005 | Seidel et al. | 73/170.02 |
| 7,001,069 B1 * | 2/2006 | Phipps | 374/208 |
| 7,014,357 B1 * | 3/2006 | Severson | 374/16 |
| 7,014,359 B1 * | 3/2006 | Suga | 374/208 |
| 7,036,365 B1 * | 5/2006 | Choisnet | 73/170.02 |
| 2004/0190590 A1 * | 9/2004 | Wienand et al. | 374/147 |
| 2005/0232332 A1 * | 10/2005 | Hanson et al. | 374/141 |
| 2006/0056489 A1 * | 3/2006 | Bernard et al. | 374/208 |

FOREIGN PATENT DOCUMENTS

| | | | |
|---|---|---|---|
| GB | 2173861 A | * | 10/1986 |

* cited by examiner

TEMPERATURE SENSOR SYSTEM FOR MOBILE PLATFORMS

GOVERNMENT-FUNDED INVENTION

The invention was made with Government support under Agreement No. 98-C-00031 awarded by the Federal Aviation Administration. The Government has certain rights in this invention.

BACKGROUND OF THE INVENTION

1. Field of the Invention

The invention is related to the field of temperature sensors, and in particular, to a temperature sensor system that detects the temperature outside of the boundary layer of a mobile platform.

2. Statement of the Problem

Airplanes continuously sense the outside air temperature while in flight. When in flight, airplanes have a boundary layer that is formed by airflow around the airplane. The boundary layer typically extends about 3 inches above the skin of the airplane. The friction between the airflow and the airplane skin heats the air in the boundary layer, which is referred to as frictional heating. Thus, the air temperature within the boundary layer is artificially increased by the frictional heating.

To obtain an accurate outside air temperature that is unaffected by frictional heating, temperature sensors have been developed that attach to an airplane and extend outward beyond the boundary layer. Some of these sensors have redundant sensor components for reliability. Unfortunately, these temperature sensors do not have sufficient accuracy for scientific applications and optimal engine performance.

Because the temperature sensors extend away from the airplane through the boundary layer, the sensors introduce drag and increase fuel consumption. The extended temperature sensors reduce the stealth characteristics of the airplane. The extended temperature sensors also collect unwanted materials, such as ice and feathers, that cause sensor failure. Heaters are typically required for the extended sensors to prevent icing, but the heaters add cost, are subject to failure, and they can add errors to the temperature measurement.

An alternative temperature sensor includes a laser that directs a beam through the boundary layer. Energy from the beam is reflected from beyond the boundary layer and back to the temperature sensor. The temperature sensor processes the reflected energy to detect the temperature outside of the boundary layer. Although this alternative temperature sensor is more accurate than the above-described temperature sensors, the laser-based sensor does not provide accurate results in the presence of heavy fog, clouds, or precipitation that interfere with the laser beam and its reflection.

SUMMARY OF THE SOLUTION

Some examples of the invention include a temperature sensor system and its method of operation. The temperature sensor system includes a body and window arrangement. The body defines an air intake and is configured for flush mounting to a mobile platform having a boundary layer. The window arrangement is integrated into the body and configured to transfer a first signal and to receive a second signal. The second signal represents energy from the first signal that is reflected by air particles beyond the boundary layer. The second signal is processed to determine a temperature beyond the boundary layer. The air intake is configured to: receive air particles, transfer a first set of the air particles to a first air vent into the mobile platform, receive the first set of the air particles from a second air vent from the mobile platform, vent the first set of the air particles, and vent a second set of the air particles that bypass the first air vent.

In some examples of the invention, the window arrangement comprises a first window configured to pass the first signal and a second window configured to pass the second signal.

In some examples of the invention, the temperature sensor system includes the first air vent and the second air vent.

In some examples of the invention, the temperature sensor system further comprises a measurement cell coupled to the first air vent and the second air vent. The measurement cell may include one or two temperature sensors and a pressure sensor.

In some examples of the invention, the air intake is configured to accelerate the air particles so the first set of the air particles enter the first air vent and the second set of the air particles by pass the first air vent.

In some examples of the invention, the second set of the air particles are heavier than the first set of the air particles.

In some examples of the invention, the temperature sensor system comprises a device configured to generate the first signal. The device could be a laser device and the first signal could be a laser signal.

In some examples of the invention, the temperature sensor system comprises a telescope configured to receive the second signal from the window arrangement.

In some examples of the invention, the temperature sensor system comprises an optical interface and sensor configured to receive and process the second signal to determine the temperature beyond the boundary layer.

In some examples of the invention, the temperature sensor system comprises: the first air vent and the second air vent; a measurement cell coupled to the first air vent and the second air vent, wherein the measurement cell includes a temperature sensor configured to determine a first temperature; an optical interface and sensor configured to receive and process the second signal to determine a second temperature; and circuitry configured to receive and process the first temperature and the second temperature to determine the temperature beyond the boundary layer.

In some examples of the invention, the temperature sensor system comprises: the first air vent and the second air vent; a measurement cell coupled to the first air vent and the second air vent, wherein the measurement cell includes a first temperature sensor configured to determine a first temperature and a second temperature sensor configured to determine a second temperature; an optical interface and sensor configured to receive and process the second signal to determine a third temperature; and circuitry configured to receive and process the first temperature, the second temperature, and the third temperature to determine the temperature beyond the boundary layer.

In some examples of the invention, the temperature sensor system comprises: the first air vent and the second air vent; a measurement cell coupled to the first air vent and the second air vent, wherein the measurement cell includes a temperature sensor configured to determine a first temperature and a pressure sensor configured to determine a pressure; an optical interface and sensor configured to receive and process the second signal to determine a second temperature; and circuitry configured to receive and process the first temperature, the second temperature, and the pressure to determine the temperature beyond the boundary layer.

In some examples of the invention, the temperature sensor system comprises: an optical interface and sensor configured to receive and process the second signal to determine the temperature beyond the boundary layer and to determine a signal-to-noise ratio for the second signal; and circuitry configured to process the a signal-to-noise ratio to determine if the mobile platform is in clear air or in unclear air.

In some examples of the invention, the mobile platform comprises an airplane.

In some examples of the invention, the mobile platform comprises a ground vehicle.

In some examples of the invention, the mobile platform comprises an unmanned vehicle.

DESCRIPTION OF THE DRAWINGS

The same reference number represents the same element on all drawings.

DETAILED DESCRIPTION OF THE INVENTION

FIGS. 1–4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
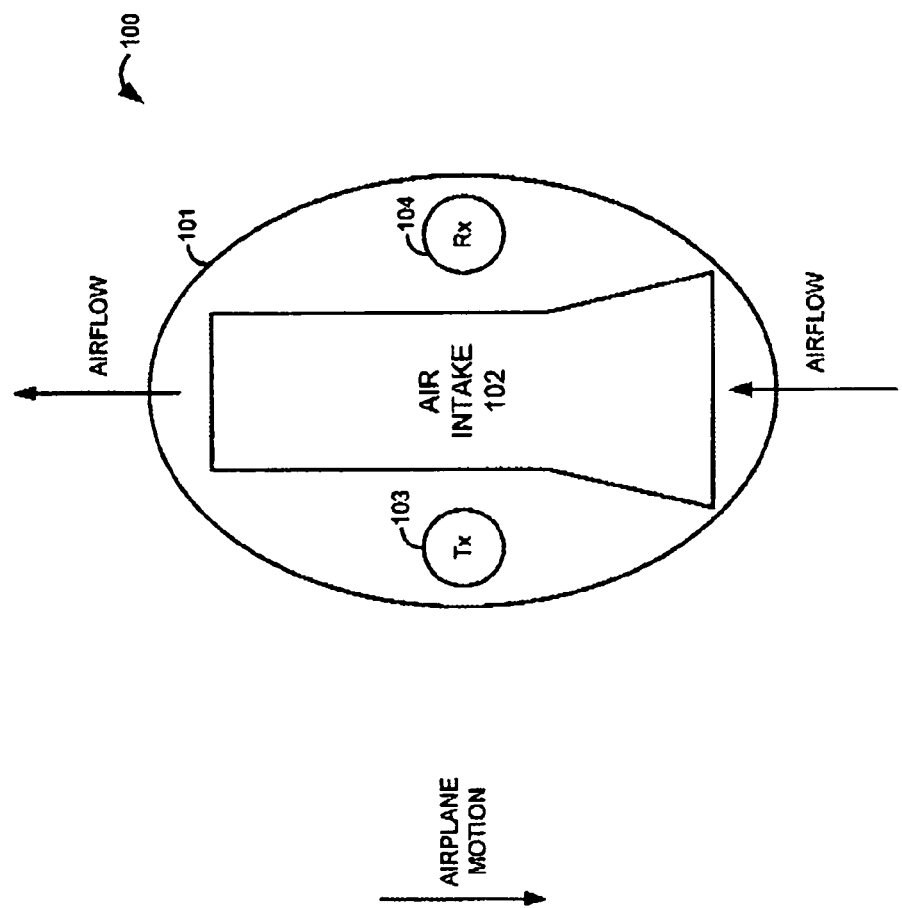
FIG. 1 illustrates a top view of a temperature sensor system in an example of the invention.

FIG. 1 illustrates a top view of temperature sensor system 100 in an example of the invention. Temperature sensor system 100 is typically attached to an airplane, although sensor system 100 could be attached to other mobile platforms, such as ground vehicles, alternative aircraft, unmanned mobile systems, or the like. Temperature sensor system 100 includes body 101, air intake 102, transmit window 103, and receive window 104. Body 101 could be comprised of aluminum or some other suitable material. Air intake 102 is formed by body 101. Windows 103–104 could be glass, plastic, or some other material suitable to pass signals 105–106. Note the direction of the airflow through air intake 102, which is largely generated by the motion of the airplane.

Figure 2:
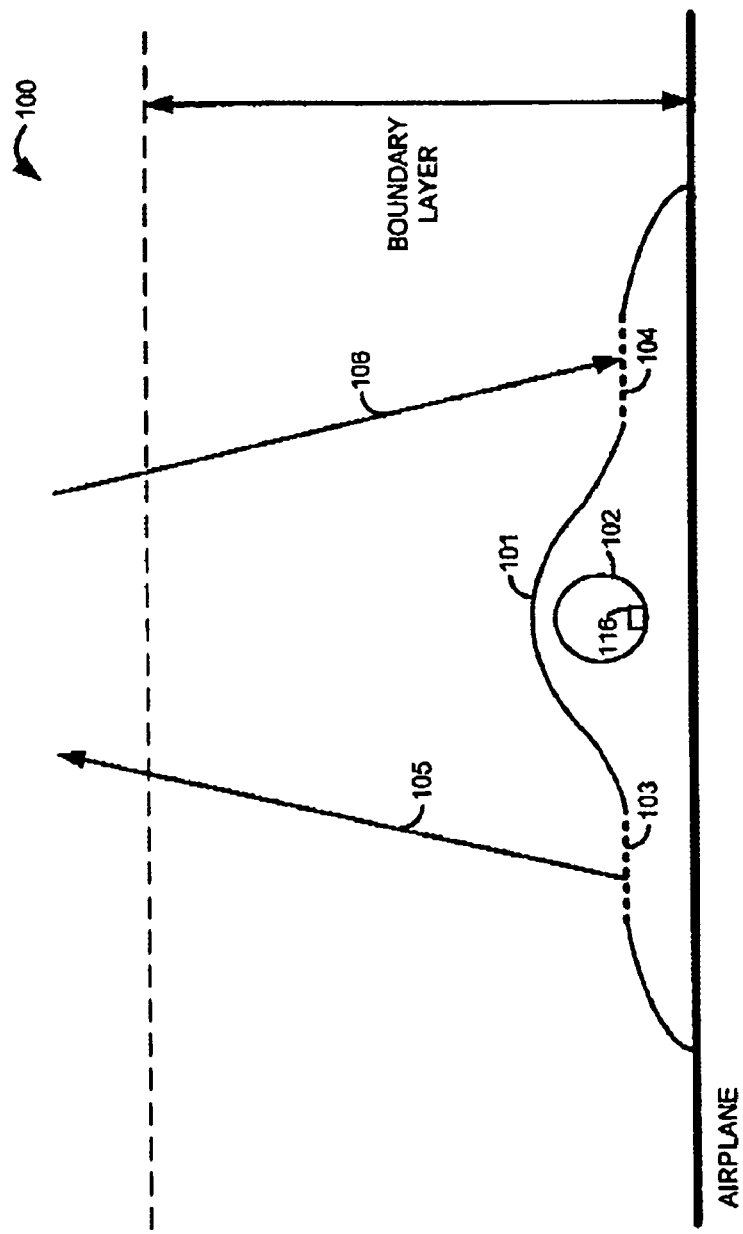
FIG. 2 illustrates a front view of a temperature sensor system in an example of the invention.

FIG. 2 illustrates a front view of temperature sensor system 100 in an example of the invention. Temperature sensor system 100 is attached to an airplane. The connection to the airplane typically includes a filler plate, which is familiar to those skilled in the art and is omitted for clarity. Temperature sensor system 100 includes body 101, air intake 102, transmit window 103, receive window 104, and flow enhancer 116. If desired, a steel ring may form the entrance of air intake 102. On FIG. 2, the direction of airflow is into the page, and the motion of the airplane is out of the page.

Note the boundary layer that exists above skin of the airplane. The boundary layer is created by the airflow around the airplane as the plane flies. The boundary layer is typically around 3 inches, but the thickness of the boundary layer can vary. The air within the boundary layer experiences frictional heating caused by the airplane. Thus, accurate temperature measurements should be taken outside of the boundary layer, or should remove the frictional heating component from any temperature measurement taken within the boundary layer.

Transmit signal 105 is generated and transferred through transmit window 103 and the boundary layer. Energy from transmit signal 105 is reflected from air particles outside of the boundary layer to form reflected signal 106. Note that the air particles outside of the boundary layer are not artificially heated by the frictional heating within the boundary layer. Reflected signal 106 is received and processed to determine the temperature outside of the boundary layer. Advantageously, the temperature inaccuracy caused by the frictional heating is minimized or eliminated by sensing the temperature outside of the boundary layer. In some examples of the invention, signals 105–106 are optical signals that have a wavelength of less than one centimeter, such as a laser signal.

Figure 3:
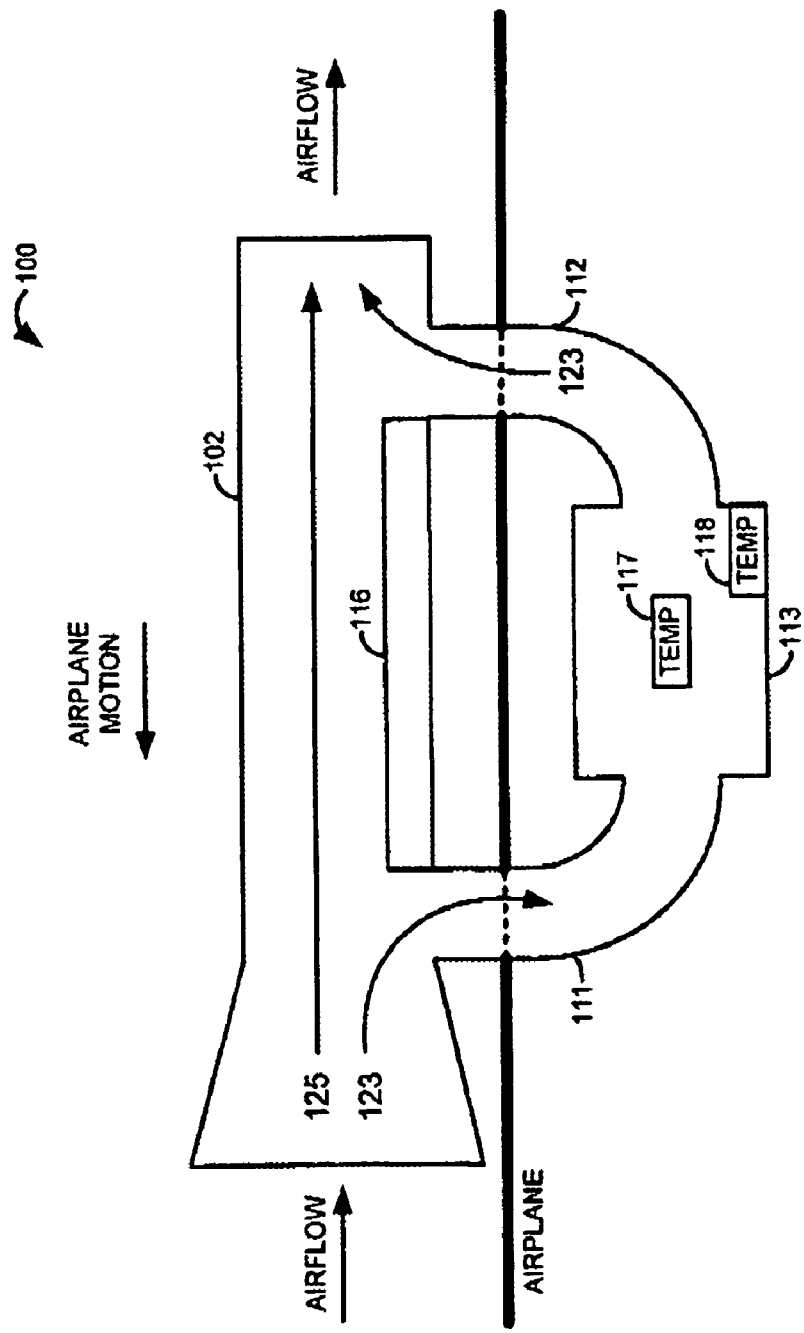
FIG. 3 illustrates a side view of a temperature sensor system in an example of the invention.

FIG. 3 illustrates a side view of temperature sensor system 100 in an example of the invention. Body 101 and windows 103–104 are not shown for clarity. Air intake 102 includes flow enhancer 116. Air intake 102 is coupled to air vents 111–112. Measurement cell 113 is coupled to air vents 111–112. Measurement cell 113 includes temperature sensors 117–118. Note that temperature sensor 117 is positioned in the middle of measurement cell 113, and temperature sensor 118 is positioned near the end of measurement cell 113. Temperature sensors 117–118 could be platinum-resistance thermometers. Air vents 111–112 could be stainless steel tubes, Kevlar hoses, or the like, and in some examples of the invention, air vents 111–112 may represent mere openings between air intake 102 and measurement cell 113.

Air intake 102 has some aerodynamic features to note. The front of air intake 102 has a tapered shape that narrows from its entrance to air vent 111. Flow enhancer 116 is a surface that is above the lower level of air intake 102 at air vents 111–112. Flow enhancer 116 could be a rectangular block placed on the bottom of air intake 102. In some examples, additional flow enhancers could be added that form arcs from air vents 111–112 to flow enhancer 116, where the arcs extend above the surface of flow enhancer 116.

The aerodynamic features accelerate the air entering air intake 102 before the air reaches air vent 111. The acceleration adds momentum to heavier air particles 125, such as ice, water, and aerosols, and the added momentum causes the heavier air particles 125 to pass over air vent 111. These heavier air particles 125 are eventually vented from the back end of air intake 102. In the context of the invention, air particles include aerosols, ice crystals, water droplets, and molecules (such as nitrogen, oxygen, or other molecules found in the air). Lighter air particles 123 enter air intake 102 and follow air vent 111 to measurement chamber 113. Within measurement chamber 113, temperature sensors 117–118 measure air temperatures and transfer corresponding temperature signals. The air particles in measurement chamber 113 flow through air vent 112 and back to air intake 102. Air intake 102 vents the lighter air particles m from air vent 112 along with the heavier air particles 125 that bypassed air vent 111. In some example embodiments of the invention the liebter air narticles 123 are referred to as a first set of air particles and the heavier air particles 125 are referred to as a second set of air particles.

Figure 4:
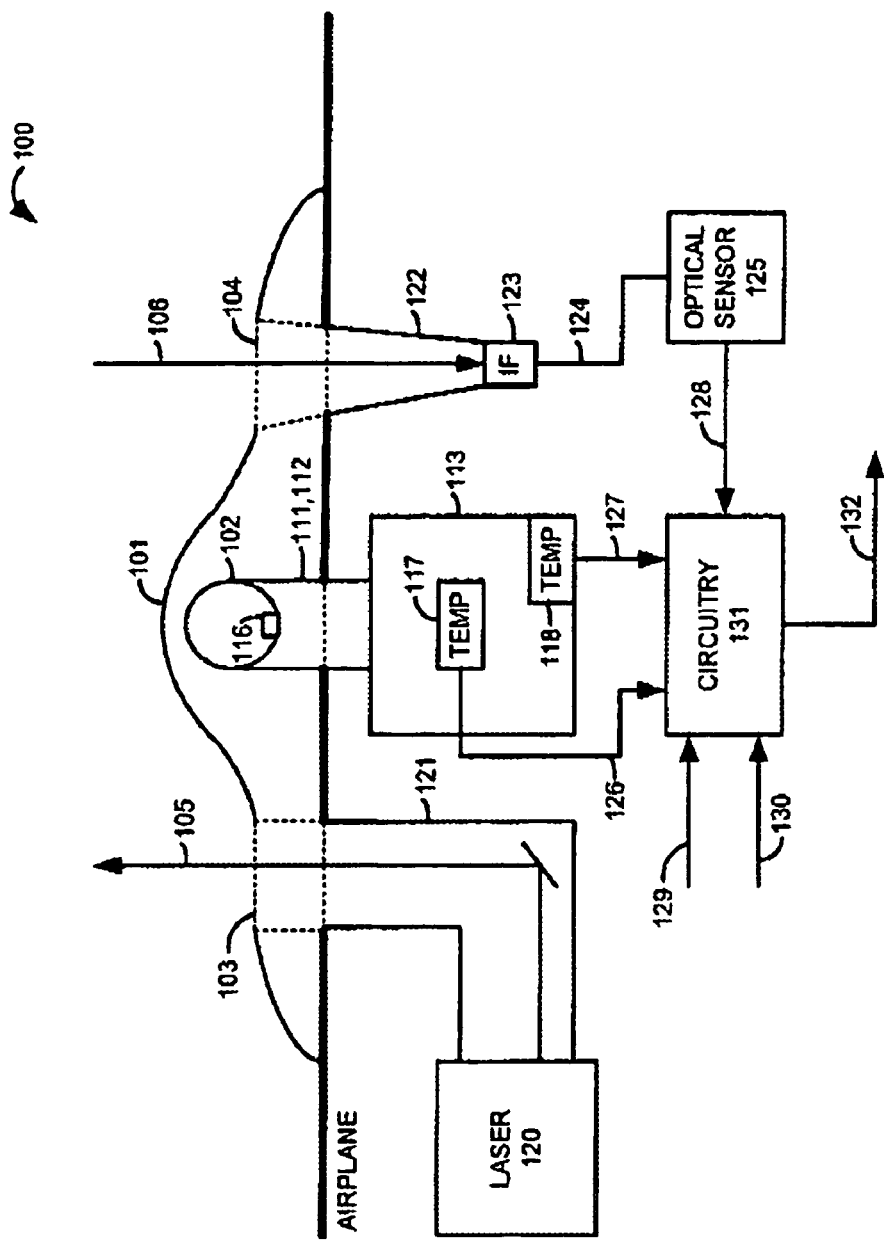
FIG. 4 illustrates a front view of a temperature sensor system in an example of the invention.

FIG. 4 illustrates a front view of temperature sensor system 100 in an example of the invention. Temperature sensor system 100 is attached to an airplane, and the direction of airflow is into the page, while the motion of the airplane is out of the page. Temperature sensor system 100 includes body 101, air intake 102, windows 103–104, air vents 111–112, measurement cell 113, flow enhancer 116, and temperature sensors 117–118. Note that temperature sensor 117 is positioned in the middle of measurement cell 113, and temperature sensor 118 is positioned on the side of measurement cell 113. Temperature sensor system 100 also includes laser 120, signal paths 121–122, optical interface 123, optical fiber 124, optical sensor 125, and circuitry 131.

As the airplane flies, air particles are directed to through air intake 102 and air vent 111 to measurement cell 113. In measurement cell 113, sensors 117–118 sense temperatures and transfer temperature signals 126–127 to circuitry 131. In addition, laser 120 transfers transmit signal 105 through signal path 121 and window 103. Signal path 121 may include mirrors to direct signal 105 from laser 120 to transmit window 103. Transmit signal 105 reflects off of air particles to form reflected signal 106. Reflected signal 106 propagates through window 104 and signal path 122 to optical interface 123. Signal path 122 may include a telescope to collect and focus reflected signal 106 onto optical interface 123.

Optical interface 123 collects reflected signal 106 and transfers a corresponding optical signal over optical fiber 124 to optical sensor 125. Optical sensor 125 processes the optical signal to determine the temperature outside of the boundary layer—referred to as $T_L$. Optical sensor 125 transfers temperature signal 128 indicating $T_L$ to circuitry 131. Optical sensor 125 could include a Fabry-Perot interferometer.

Circuitry 131 could be programmed general-purpose circuitry, special purpose circuitry, or a combination of both. Circuitry 131 may be distributed in various locations in the airplane. Circuitry 131 receives temperature signals 126–127 from sensors 117–118. The temperature that is indicated by signal 126 from sensor 117 is referred to as $T_{ST}$. The temperature that is indicated by signal 127 from sensor 118 is referred to as $T_{SA}$. Circuitry 131 also receives data signals 129 130 from the airplane, where data signals 129–130 respectively indicate air speed (mach number) and air pressure. Circuitry 131 processes signals 126–130 to determine the air temperature outside of the boundary layer—referred to as TA. Circuitry 131 generates and transfers signal 132 indicating $T_A$.

Circuitry 131 calculates three separate versions of $T_A$ based the three separate data inputs ($T_{ST}$, $T_{SA}$, $T_L$) from the three separate sensors (117, 118, 125). For $T_L$ from sensor 125, circuitry 131 uses the simple equation $T_A = T_L$. For $T_{SA}$ from sensor 118, circuitry 131 removes the frictional heating component to obtain $T_A$ using the following equation:

$$T_A = T_{SA} - (a_{S1} + a_{S2}M + a_{S3}M^2); \text{ where}$$

M=the air speed mach number; and $a_{S1}$, $a_{S2}$, and $a_{S3}$ are coefficients that are obtained through empirical testing using a method of least squares as a maximum likelihood estimator of the coefficients.

For $T_{ST}$ from sensor 117, circuitry 131 removes the frictional heating component to obtain $T_A$ using the following equation:

$$T_A = T_{ST} - (a_{T1} + a_{T2}M + a_{T3}M^2); \text{ where}$$

M is the air speed mach number; and $a_{T1}$, $a_{T2}$, and $a_{T3}$ are coefficients that are obtained through empirical testing using a method of least squares as a maximum likelihood estimator of the coefficients.

After calculating the three versions of $T_A$, circuitry 131 selects one of the versions to output as signal 132. Typically, circuitry 131 selects the $T_A$ that is derived from the laser obtained temperature $T_L$. However, $T_L$ may become unreliable due to fog, clouds, precipitation, or mechanical failure. The Signal-to-Noise Ratio (SNR) of sensor 125 will indicate if $T_L$ becomes unreliable, so if this SNR exceeds a threshold, then circuitry 131 selects the $T_A$ that was derived from $T_{SA}$ and/or $T_{ST}$. For example, circuitry 131 may average the two $T_A$ values derived from $T_{SA}$ and $T_{ST}$. Circuitry 131 could use a Kalman filter to make the selection based on the SNR. Note that sensor system 100 has three independent sources to obtain $T_A$ to provide very-high reliability.

Based on the SNR data for optical sensor 125, circuitry 131 could determine if the airplane is in clear air or is in fog, clouds, or heavy precipitation. Circuitry 131 could indicate the clear/unclear status correlated with time in a data signal. Circuitry 131 could also label the temperature data for $T_A$ with the clear/unclear status.

If desired a pressure measurement can be used to improve accuracy, since pressure affects frictional heating in the boundary layer. Different coefficients suited for different pressures can be developed during the empirical testing. Circuitry 131 could process the pressure indication in data signal 130 to select the most suitable coefficients given the current pressure. If desired, a pressure sensor could be added to measurement cell 113 to provide the pressure data to circuitry 131.

In one example, sensor system 100 has the following dimensions, although the included components and dimensions may vary in other examples. Dimensions are given in height, width, and length.

Maximum dimensions of body 101: 0.787 inches×4.277 inches×5.369 inches

Diameter of the entrance of air intake 102: 0.418 inches

Distance of air intake 102 from the entrance to air vent 111: 0.540 inches Diameter of air intake 102 at air vent 111: 0.380 inches Distance of air intake 102 from air vent 111 to air vent 112: 1.874 inches Diameter of air intake 102 at air vent 112: 0.380 inches Dimensions of flow enhancer 116: 0.068 inches×0.125 inches×1.875 inches Diameter of air vent 111: 0.250 inches Dimensions of measurement cell 113: 0.787 inches×0.787 inches×2.374 inches Diameter of air vent 112: 0.250 inches Diameter of windows 103–104: 1.575 inches Various technical aspects that are applicable to the present invention are described in U.S. patent application Ser. No. 10/304,577; filed on Nov. 26, 2002; entitled "An Aerial Sampler System"; having the same inventor as the present invention; and which is hereby incorporated by reference into this patent application.

In an alternative example of the invention, the laser components (103–104, 120–125, and 128) could be replaced by other suitable electro-magnetic systems.

In an alternative example of the invention, a heated ring could be added to the rim of the entrance to air intake 102.

In an alternative example of the invention, windows 103 and 104 could be integrated together.

In another alternative example of the invention, the laser components (103–104, 120–125, and 128) are omitted, and only temperature sensors 117–118 are used to determine TA. This alternative sensor system is less expensive than one with the laser components. The laser-based sensor could be used in testing to optimize the coefficients and algorithms used by the alternative system.

In an alternative example of the invention, one of the temperature sensors 117–118 and its associated processing are omitted. Only one of temperature sensors 117–118 would be used to back-up the laser-based sensor 125.

Advantages

Some examples of the invention provide the following advantages, although other examples of the invention may not provide these advantages. Temperature sensor system 100 is highly accurate. The high accuracy is more suitable for scientific and aviation applications. For example, highly accurate temperature data could be obtained by airplanes using temperature sensor system 100. The highly-accurate temperature data could be processed with satellite-derived temperature data to provide improved temperature maps of the atmosphere, especially in the upper troposphere, tropopause, and lower stratosphere.

Temperature sensor system 100 has a highly-aerodynamic profile. The highly-aerodynamic profile reduces drag to increase fuel efficiency. The highly-aerodynamic profile improves the stealth capabilities of the airplane. The highly-aerodynamic profile reduces or eliminates the collection of ice, feathers, and the like. Thus, the aerodynamic profile allows heating elements to be omitted if desired.

Temperature sensor system 100 is highly-reliable. The aerodynamic design provides reliability by eliminating the heater which is prone to failure, and by eliminating the collection of unwanted debris, such as ice and feathers. The back-up temperature sensors provide accurate temperature data even if one of the sensors fails or becomes unreliable.

The invention claimed is:

1. A temperature sensor system comprising:
a body defining an air intake and configured for flush mounting to a mobile platform having a boundary layer;
a window arrangement integrated into the body and configured to transfer a first signal and to receive a second signal, wherein the second signal represents energy from the first signal that is reflected by air particles beyond the boundary layer, and wherein the second signal is processed to determine a temperature beyond the boundary layer; and wherein
the air intake is configured to receive air particles, transfer a first set of the air particles to a first air vent into the mobile platform, receive the first set of the air particles from a second air vent from the mobile platform, vent the first set of the air particles, and vent a second set of the air particles that bypass the first air vent.

2. The temperature sensor system of claim 1 wherein the window arrangement comprises a first window configured to pass the first signal and a second window configured to pass the second signal.

3. The temperature sensor system of claim 1 further comprising the first air vent and the second air vent.

4. The temperature sensor system of claim 3 further comprising a measurement cell coupled to the first air vent and the second air vent, wherein the measurement cell includes a temperature sensor.

5. The temperature sensor system of claim 3 further comprising a measurement cell coupled to the first air vent and the second air vent, wherein the measurement cell includes two temperature sensors.

6. The temperature sensor system of claim 3 further comprising a measurement cell coupled to the first air vent and the second air vent, wherein the measurement cell includes a pressure sensor.

7. The temperature sensor system of claim 1 wherein the air intake is configured to accelerate the air particles so the first set of the air particles enter the first air vent and the second set of the air particles by pass the first air vent.

8. The temperature sensor system of claim 7 wherein the second set of the air particles are heavier than the first set of the air particles.

9. The temperature sensor system of claim 1 further comprising a device configured to generate the first signal.

10. The temperature sensor system of claim 9 wherein the device comprises laser device and the first signal comprises a laser signal.

11. The temperature sensor system of claim 1 further comprising a telescope configured to receive the second signal from the window arrangement.

12. The temperature sensor system of claim 1 further comprising an optical interface and sensor configured to receive and process the second signal to determine the temperature beyond the boundary layer.

13. The temperature sensor system of claim 1 further comprising:
the first air vent and the second air vent;
a measurement cell coupled to the first air vent and the second air vent, wherein the measurement cell includes a temperature sensor configured to determine a first temperature;
an optical interface and sensor configured to receive and process the second signal to determine a second temperature; and
circuitry configured to receive and process the first temperature and the second temperature to determine the temperature beyond the boundary layer.

14. The temperature sensor system of claim 1 further comprising:
the first air vent and the second air vent;
a measurement cell coupled to the first air vent and the second air vent, wherein the measurement cell includes a first temperature sensor configured to determine a first temperature and a second temperature sensor configured to determine a second temperature;
an optical interface and sensor configured to receive and process the second signal to determine a third temperature; and
circuitry configured to receive and process the first temperature, the second temperature, and the third temperature to determine the temperature beyond the boundary layer.

15. The temperature sensor system of claim 1 further comprising:
the first air vent and the second air vent;
a measurement cell coupled to the first air vent and the second air vent, wherein the measurement cell includes a temperature sensor configured to determine a first temperature and a pressure sensor configured to determine a pressure;
an optical interface and sensor configured to receive and process the second signal to determine a second temperature; and
circuitry configured to receive and process the first temperature, the second temperature, and the pressure to determine the temperature beyond the boundary layer.

16. The temperature sensor system of claim 1 further comprising:

an optical interface and sensor configured to receive and process the second signal to determine the temperature beyond the boundary layer and to determine a signal-to-noise ratio for the second signal; and circuitry configured to process the a signal-to-noise ratio to determine if the mobile platform is in clear air or in unclear air.

17. The temperature sensor system of claim 1 wherein the mobile platform comprises an airplane.

18. The temperature sensor system of claim 1 wherein the mobile platform comprises a ground vehicle.

19. The temperature sensor system of claim 1 wherein the mobile platform comprises an unmanned vehicle.

20. A method of operating a temperature sensor system flush mounted to a mobile platform having a boundary layer, the method comprising:

transferring a first signal from temperature sensor system;

receiving a second signal into the temperature sensor system, wherein the second signal represents energy from the first signal that is reflected by air particles beyond the boundary layer, and wherein the second signal is processed to determine a temperature beyond the boundary layer;

receiving air particles into the temperature sensor system;

transferring a first set of the air particles to a first air vent into the mobile platform;

receiving the first set of the air particles from a second air vent from the mobile platform;

venting the first set of the air particles from the temperature sensor system; and venting a second set of the air particles that bypass the first air vent from the temperature sensor system.

21. The method of claim 20 wherein transferring the first signal from temperature sensor system comprises passing the first signal through a first window and receiving the second signal comprises passing the second signal through a second window.

22. The method of claim 20 further comprising transferring the first set of the air particles through the first air vent and through the second air vent.

23. The method of claim 22 further comprising receiving the first set of the air particles from the first air vent, measuring a temperature of the first set of the air particles from the first air vent, and transferring the first set of the air particles to the second air vent.

24. The method of claim 22 further comprising receiving the first set of the air particles from the first air vent, measuring a first temperature and a second temperature of the first set of the air particles from the first air vent, and transferring the first set of the air particles to the second air vent.

25. The method of claim 22 further comprising receiving the first set of the air particles from the first air vent, measuring a temperature of the first set of the air particles from the first air vent, measuring a pressure of the first set of the air particles from the first air vent, and transferring the first set of the air particles to the second air vent.

26. The method of claim 20 wherein receiving the air particles into the temperature sensor system comprises accelerating the air particles so the first set of the air particles enter the first air vent and the second set of the air particles by pass the first air vent.

27. The method of claim 26 wherein the second set of the air particles are heavier than the first set of the air particles.

28. The method of claim 20 further comprising generating the first signal.

29. The method of claim 28 wherein generating the first signal comprises generating a laser signal.

30. The method of claim 20 wherein receiving the second signal into the temperature sensor system comprises receiving the second signal through a window into a telescope.

31. The method of claim 20 further comprising processing the second signal to determine the temperature beyond the boundary layer.

32. The method of claim 20 further comprising:
receiving the first set of the air particles from the first air vent;
measuring a first temperature of the first set of the air particles from the first air vent;
transferring the first set of the air particles to the second air vent;
processing the second signal to determine a second temperature; and
processing the first temperature and the second temperature to determine the temperature beyond the boundary layer.

33. The method of claim 20 further comprising:
receiving the first set of the air particles from the first air vent;
measuring a first temperature and a second temperature of the first set of the air particles from the first air vent;
transferring the first set of the air particles to the second air vent;
processing the second signal to determine a third temperature; and
processing the first temperature, the second temperature, and the third temperature to determine the temperature beyond the boundary layer.

34. The method of claim 20 further comprising:
receiving the first set of the air particles from the first air vent;
measuring a first temperature and a pressure of the first set of the air particles from the first air vent;
transferring the first set of the air particles to the second air vent;
processing the second signal to determine a second temperature; and
processing the first temperature, the second temperature, and the pressure to determine the temperature beyond the boundary layer.

35. The method of claim 20 further comprising:
processing the second signal to determine the temperature beyond the boundary layer and to determine a signal-to-noise ratio for the second signal; and
processing the a signal-to-noise ratio to determine if the mobile platform is in clear air or in unclear air.

36. The method of claim 20 wherein the mobile platform comprises an airplane.

37. The method of claim 20 wherein the mobile platform comprises a ground vehicle.

38. The method of claim 20 wherein the mobile platform comprises an unmanned vehicle.

* * * * *